Figure 1:
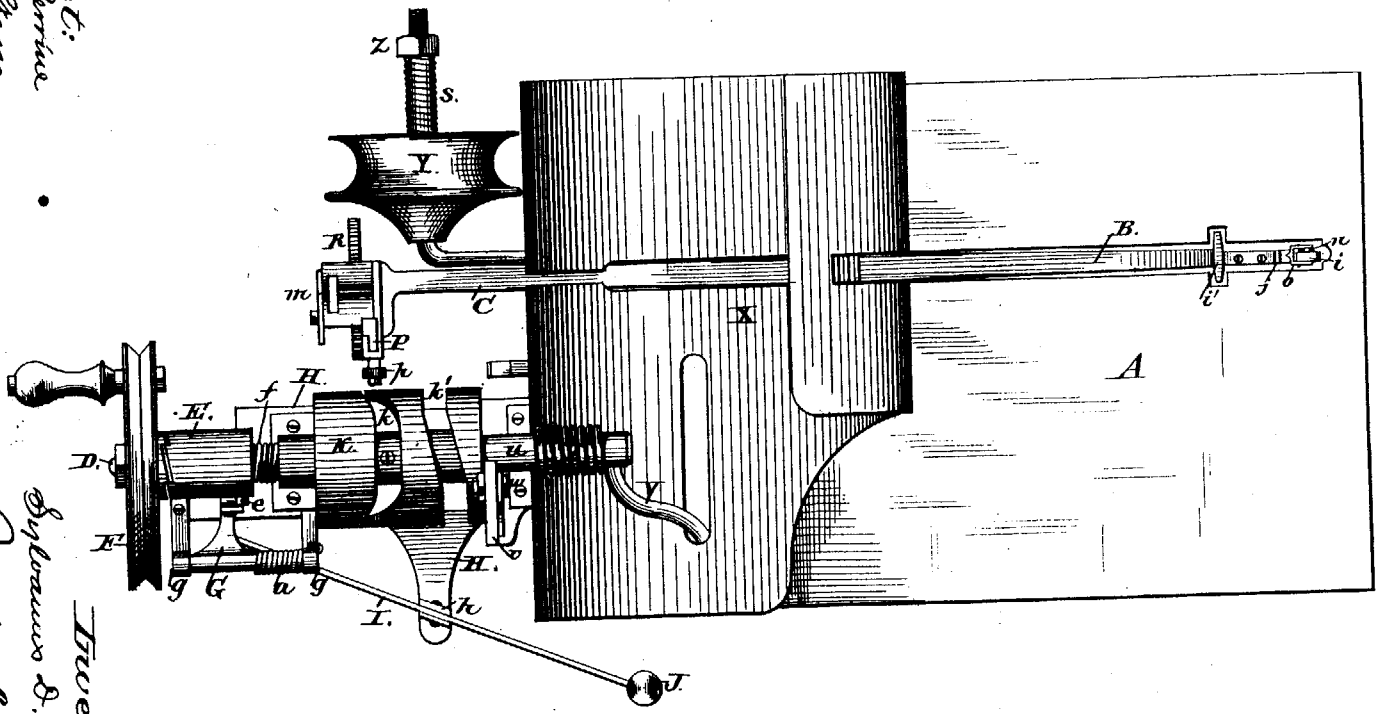

58- HARVESTERS
45-3-

BEST AVAILABLE COPY

3 Sheets—Sheet 1.

S. D. LOCKE.

Grain-Binder.

No. 9,014. Reissued Dec. 30, 1879.

Attest:
H. L. Perrine
Geo Stern

Inventor:
Sylvanus D. Locke
By, Dana Wilson & Dana Wilson
Atty's

N. PETERS, PHOTO-LITHOGRAPHER, WASHINGTON, D. C.

3 Sheets—Sheet 2.
S. D. LOCKE.
Grain-Binder.
No. 9,014. Reissued Dec. 30, 1879.
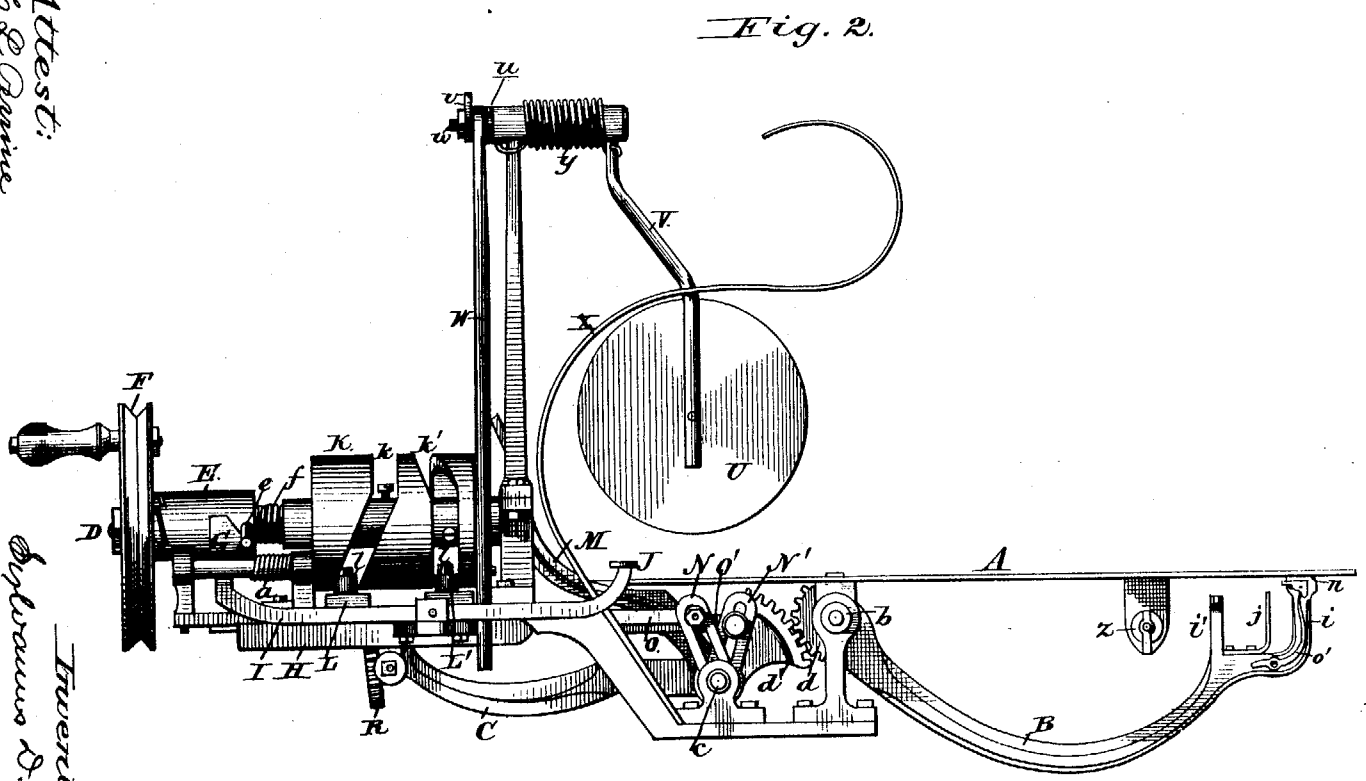
Attest:
H. L. Perine
Geo. Skerry
Inventor:
Sylvanus D. Locke
By. Dancison and Dancison
Atty's
N. PETERS, PHOTO-LITHOGRAPHER, WASHINGTON, D. C.

455-
3 Sheets—Sheet 3.
S. D. LOCKE.
Grain-Binder.
No. 9,014. Reissued Dec. 30, 1879.
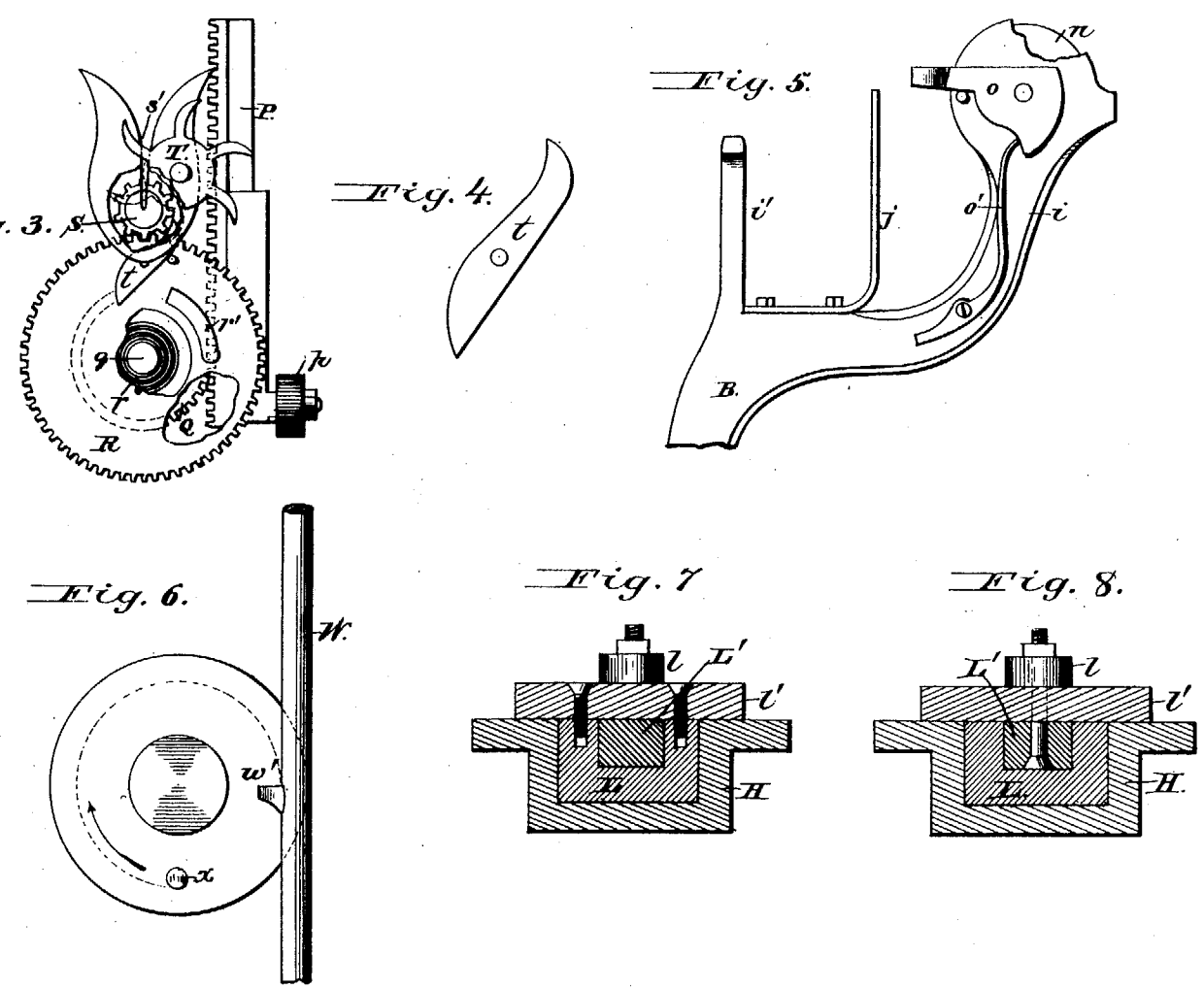
Attest
H. C. Perrine
Geo. Skinner
Inventor.
Sylvanus D. Locke
By. Parkinson and Parkinson
Atty's
N. PETERS, PHOTO-LITHOGRAPHER, WASHINGTON, D. C.

UNITED STATES PATENT OFFICE.

SYLVANUS D. LOCKE, OF HOOSICK FALLS, NEW YORK.

IMPROVEMENT IN GRAIN-BINDERS.

Specification forming part of Letters Patent No. 56,580, dated July 24, 1866; Reissue No. 9,014, dated December 30, 1879; application filed August 20, 1879.

DIVISION A.

*To all whom it may concern:*

Be it known that I, SYLVANUS D. LOCKE, formerly of the city of Janesville, county of Rock, and State of Wisconsin, but now of Hoosick Falls, in the county of Rensselaer and State of New York, have invented certain new and useful Improvements in Machines for Binding Grain, of which the following is a specification.

My invention relates to automatic binding mechanism adapted to be attached to and driven by power from an ordinary harvester, or from any other suitable source, and to receive grain from said harvester, properly bind it in any sized sheaf, and then eject it upon the ground; and it consists in appliances for bringing the automatic action of the machine under control of the attendant; in controllable connections between the binding mechanism and its prime motor, adapted to drive it in one direction only; in adjusting devices to compensate for wear or springing of parts; in provisions for controlling the revolution of the twister; and in the various devices and combinations of devices hereinafter described, and pointed out in the claims.

In the drawings, Figure 1 is a plan view of a machine embodying my improvements. Fig. 2 is a side elevation thereof. Fig. 3 represents a binding-head suitable for use upon said machine. Figs. 4, 5, 6, 7, and 8 illustrate details.

A is a grain table or receptacle, intended to receive grain from the harvester through the means of either automatic or hand-raking apparatus.

B is the band-carrying arm, and C the arm which carries the binding-head.

D is the driving-shaft; E, a clutch, and F a driving-wheel, which runs loose on the shaft when the clutch is disengaged therefrom.

Upon the clutch-sleeve is a pin, *e*, and normally resting against said sleeve is an arm, G, pivoted in the lugs *g g* on the frame-work or bed-piece H, and having an inclined face or edge, against which the pin *e* comes once in each revolution of the shaft, throwing the clutch out of engagement and bringing the machine to a stop. Beneath this pivoted arm lies one end of the lever I, which has its pivot or fulcrum in the lug or projection *h* on the frame-work or bed-piece, and terminates at the other end in a foot-piece, J, for the attendant. When this lever is depressed the pivoted disengaging-arm is raised up out of contact with the pin *e*, so as to permit the spring *f* to throw the clutch into engagement with its counterpart upon the driving-wheel, and when the lever is released the arm is carried back to place upon the the periphery of the clutch-sleeve by means of a spring, *a*, upon its pivot, or of its own weight, so that in the ensuing revolution of the shaft it will be in position to perform again the same operation of disengaging the clutch.

The clutch is a one-way clutch—that is, it is so constructed that it is engaged only when the harvesting-machine is moving forward, and passes automatically out of engagement when the harvesting-machine is moving backward. It is shown as formed with ratchet-teeth arranged so that when the driving-wheel is revolved in the proper direction the perpendicular faces of the teeth engage and drive the shaft, but when its action is reversed the inclined faces ride up and slip past each other, overcoming the stress of the spring. By this means the harvester or reaper is permitted to back without actuating the binding-machine or affecting the process of binding.

K is a cam-cylinder secured to the driving-shaft by screws, and having cam-grooves *k k′*, which operate the cam-slides L L′. (Shown on an enlarged scale in Figs. 7 and 8.) Each slide is formed with a projection or anti-friction roll, *l*, to take into its respective groove in the cylinder. The slide L reciprocates in a planed way in the frame or bed-piece H, and within this slide is formed a way for the slide L′. Their upper faces are flush with the surface of the bed-piece, and they are held in place therein by the feet of the standards which support the driving-shaft. To prevent the lateral strain upon their rolls from canting over and cramping the slides, the latter are provided with cross-bars *l′*, rigidly secured each to its respective slide, and overlapping the bed-piece on either side thereof. The arms which carry the band and binding-head are pivoted, respectively, at *b* and at *c*, and engage with each other by means of segmental gears *d d'*, so that the movement of one actuates the other, bringing them together for the binding operation, or throwing them apart as it is completed.

Near to the arm C, and vibrating upon the same axis by means of a sleeved hub, is an arm, M, intended to operate a sliding rack in the binding-head carried by the former. Upon the shaft of the arm C is a crank, N, and upon the hub of the arm M a crank, N'. These are operated, respectively, from the cam-slides L and L' by means of connecting-arms or pitmen O O', and the connection between the cranks and pitmen is made adjustable by means of a slot in the crank, through which is passed the connecting-bolt or other compensating device, as a recess in or sleeve upon the crank, thus enabling the working length of the crank to be varied. This allows any derangement caused by wear or springing of parts to be taken up and the play of the rack which operates the twister to be accurately determined to control the revolution of the twister.

In Fig. 3 I have shown a binding head adapted for use with the arms C and M. This binding-head forms the subject of Letters Patent No. 60,208, granted to me December 4, 1866, the application for which was concurrent with the original application in this case, and therefore I lay no claim to it by itself herein.

In appropriate ways at the end of the arm C is mounted a sliding rack, P, having a lateral lug, upon which turns the anti-friction roller *p*. The rack meshes with a pinion, Q, made fast to a gear-wheel, R, which drives the twister S. Upon the pinion-shaft *q* is a scroll-spring, *r*, so connected that it is wound up by the forward revolution of the pinion in the twisting operation.

The twister is mounted in a suitable casing, slotted, as at *s'*, to receive and guide the wire. and upon this casing, to one side of the slot, is mounted a star-pinion or belay-wheel, T, which serves as a wire-holder, and is driven, one arm at a time, by a dog upon the band-carrying arm.

A knife, *t*, is pivoted to the binding-head, and vibrated by a segmental projection, *r'*, upon the face of the gear-wheel R coming against it, as indicated in dotted lines, so as to swing it across the slot in the twister beneath the holder and cut the wire between the two.

The vibrating arm M, actuated at the proper moment by its pitman, swings back, pressing against the roller upon the rack and drawing the latter down to a distance determined by the adjustment of the crank, thus communicating motion to the pinion and gear-wheel, which in turn rotate the slotted twisting-pinion, and at the same time wind up the scroll-spring. As the arm is withdrawn the spring unwinds and carries the rack and the parts driven thereby back to their original positions. The vibrating arm may be employed to drive the rack in both directions, so obviating the necessity of a spring; and, in case a tying device be used, this would be preferable.

The end of the band-carrying arm is shown enlarged in Fig. 5. It has, besides the terminal portion, *i*, of the main arm, a stationary finger, *i'*, which comes below the twister, and an adjustable finger, *j*, which passes above the twister through a longitudinal opening, *m*, in the casing. At the extreme end is mounted a pulley, *n*, to guide the band material, and a little below this, to one side, is pivoted a dog, *o*, held in place by a spring, *o'*, and suitable stop. This dog strikes an arm of and drives the star-pinion as it moves forward, but is permitted by the spring to ride over the pinion without actuating it upon the return movement.

U in Fig. 2 is a disk or head for ejecting the bundle or sheaf from the machine after being bound. It is located at one end of the receptacle, that it may come against the butts of the grain, and is borne by the arm V, which is journaled at *u* in a standard from the framework or bed-piece, and vibrated by means of the slotted crank *v*, pitman W, and cam-cylinder K. The slot in the crank enables the pitman, by means of its pivot-bolt *w*, to be adjusted as to its distance from the center of motion or axis about which the arm vibrates, so as to determine the limit of the outward vibration. Upon the pitman is a projection, *w'*, and upon the head of the cam-cylinder a pin, *x*, which, once in each revolution of the cylinder, strikes the projection *w'*, bringing the pitman down and causing the ejecting-head to move transversely across the grain-receptacle, pushing the sheaf before it. In this movement the shaft-spring *y* upon the pivot of the vibrating arm is coiled up, and when the pin upon the cam-cylinder passes out of engagement with the projection upon the pitman this spring returns the arm and disk or ejecting-head to their original position, as shown in the drawings.

A counterpoise may be used for the same purpose, or both movements of the arm and disk may be governed by a cam; but I prefer the spring, because by this simple means two desiderata are secured, to wit: a quick return, when the bundle is discharged, to the original position, so as to allow the next unbound bundle to be brought at once into the machine, and ready adjustment to secure uniform return to any desired position near the butt or shorn end of the bundle. This ejecting mechanism forms the subject of Letters Patent No. 57,739, granted to me September 4, 1866, the application for which was likewise concurrent with the original application in this case.

The grain-receptacle or binding-table is continued into a shield or partition, X, lying between the arms which carry the band and binding-head, and slotted continuously with the receptacle for the passage of the band material and band-carrying arm, but not admitting the passage of the binding-head, which consequently, with its arm, vibrates entirely upon one side of the shield, and is guarded from contact with the grain. By this means the device that secures the ends of the band is held close to the shield or grain-guard when operating, so as to be as near as possible to the bundle, but when not operating is carried back and away from the guard to a position secure from clogging or choking.

The wire for binding is carried by a reel, Y. Tension is secured by turning up the nut Z upon the reel-pivot, thus contracting the coiled spring *s*, causing greater friction on the reel. From the reel the wire is passed along the side of the arms B C and beneath the pulley *z*, Fig. 2, then around the pulley *n* on the end of the band-carrying arm B, and back to the binding-head at the end of the arm C, where it is passed around an arm of the star-pinion and through the slot *s'* into the opening *m* in the casing, when it is secured by twisting a knot on the end, which knot will be perpetuated as the machine works.

To operate the machine it is necessary to attach it to a harvester, so as to receive the unbound gavel either sidewise or lengthwise, according to the style of the harvester, and to apply power either by hand or from the harvester to the driving-wheel F. The grain to be bound is to be raked onto the binding-platform or grain-receptacle either by hand or by a self-raker. When a sufficient quantity has been there deposited the attendant places his foot upon the foot-piece J on the end of the lever I, and, depressing it, raises the disengaging-arm, which has until this moment held the binder out of gear from contact with the pin upon the clutch-sleeve, whereupon the clutch is forced by the spring into engagement with its counterpart on the driving-wheel, and the binding machinery is set in motion. The cam-groove *k* in the cam-cylinder first moves the slide L, which, by means of the connecting arm or pitman O and crank N, causes the arms B C to rise and approach each other. As the heads of the arms come together the wire draws the grain that is to form the sheaf or bundle into and against the circular part or shield of the grain-receptacle. The wire is pressed into place in the binding-head by the stationary finger *i'* and adjustable finger *j* of the band-carrying arm; and, as an additional security as regards accuracy of position, one of the arms of the star-pinion is carried down by the wire, and at the same time, by its peculiar construction, brings down another of the arms immediately over the wire, thus securing permanency of desired position at all times.

To still further insure the operation of this star-pinion, the spring-dog *o* strikes the arm as it reaches the binding-head and drives it positively onward, withdrawing, as hereinbefore explained, when the band-carrying arm is retracted without actuating the pinion. The binding-head and band-carrying arms having come fully together, the cam-groove *k*, which before was inclined to move their slide outward, now becomes circumferential to hold the slide and arms at rest. In this position the roller *p* is beneath and in proximity to or contact with the end of the vibrating arm M, and the projection on the cam-slide L', with which the latter is connected by its crank N' and pitman O', is just entering the inclined portion of its cam-groove *k'*, which forces it inward toward the driving-wheel, so as to bring down the vibrating arm, and this in its turn presses down the roller and the rack, giving motion to the gearing and twisting-pinion in the binding-head, and twisting the ends of the wire together in a double twist, one above and the other below the twisting-pinion. The wire being twisted, the segmental projection on the gear-wheel now comes in contact with the knife, forcing it against the wire and severing the same between the two twists. The arms B C are then retracted from each other by reason of their slide having reached and entered the return-incline of the groove *k*. The vibrating arm M is also returned to its first position by its cam, the ejecting-arm is operated, as before described, to discharge the sheaf upon the ground, and, finally, the coupling is automatically disengaged, and the binder comes to rest with its various combinations in their original position ready to receive a fresh gavel.

The next movement of the binder will, as before, be determined by the depression of the lever by the attendant upon the accumulation of a sufficient quantity of grain, the machine being thus worked to its full capacity, or substantially so, in each binding operation, and being in action in the aggregate only during the minimum of time necessary for the binding of the crop.

In order to allow the unbound gavel to be brought into the machine either sidewise or endwise, as may be necessary to adapt the grain-binder to the harvester, and also in order to prevent a portion of the straw from being left unbound by getting beneath or back of the binding material as the bundle is gathered by the raker within or against the grain-guard, which would otherwise be unavoidable in case of endwise delivery, and to prevent the misplacement of said material, I have arranged the binding devices so that this is laid horizontally across and beneath the binding-table and the bands secured above or at the side of the bundle, facilitating the discharge of the latter.

I claim as my invention—

1. In combination with a grain-receptacle to which grain is delivered by the rake, and automatic binding mechanism for taking and binding said grain as it lies in the receptacle, a clutch under control of the attendant in the train of gear which drives said mechanism, whereby the binding operation may be commenced at the moment a sufficient gavel has been laid in the receptacle.

2. In combination with a grain-receptacle receiving grain from the rake, and with automatic binding mechanism for taking and binding the grain as it lies in said receptacle, a clutch in the train of gear which drives said mechanism, and a foot-lever controlled by the attendant for causing the engagement of the clutch to start the machine independently of the rake.

3. In combination with a grain-receptacle and automatic binding mechanism working in connection therewith, a clutch in the train of gear which drives said binding mechanism, a shipper acting to throw the clutch out of engagement at the conclusion of each binding operation, and a lever controlled by the attendant to cause the re-engagement of said clutch.

4. In combination with a grain-receptacle, a vibrating band-carrying arm, and automatic band-securing mechanism working in connection therewith, a clutch in the train of gear which drives said arm and mechanism, a shipper operating to throw the clutch out of engagement as the band carrying arm reaches the limit of its return-stroke at the conclusion of each binding operation, and a lever controlled by the attendant to cause the re-engagement of said clutch.

5. In combination with a grain-receptacle and arms for holding the band and carrying it around the bundle working in connection therewith, a clutch in the train of gear which drives said arms, a lever controlled by the attendant for causing the engagement of said clutch to operate the mechanism, and a shipper which throws the clutch out of engagement as the arms reach their initial position at the conclusion of the binding operation.

6. In combination with a grain-receptacle and automatic binding devices working in connection therewith, a clutch in the train of gear which drives said binding devices, a shipper acting to throw the clutch out of engagement at the conclusion of each binding operation, and mechanism whereby the binding devices may be thrown again in gear and started after a variable period of rest.

7. In combination with a grain-receptacle and automatic binding devices working in connection therewith, a clutch in the train of gear which drives said binding devices, a shipper acting to throw the clutch out of engagement at the conclusion of each binding operation, and a lever independently controlled, whereby the clutch may be again thrown in gear and the binding devices started after a variable period of rest.

8. In combination with a grain-receptacle, a band-carrying arm moving across and through said receptacle to gather and encircle the grain therein, and a binding-head vibrating with its supporting-arm entirely upon the protected side of said receptacle in the same plane as the band-carrying arm and actuated to meet the latter to receive and unite the ends of the band in close proximity to the slot in the receptacle.

9. In combination with the slotted grain-receptacle extended into a shield slotted continuously therewith to afford a free passage to the band, the band-carrying arm moving across said receptacle to gather and encircle the grain and through the shield portion to deliver the band, and the binding-head moving entirely upon the protected side of the receptacle and shield in the same plane with the band-carrying arm, and meeting the latter as it passes through, to receive and unite the ends of the band.

10. In combination with the slotted grain-receptacle, the band-carrying arm moving across said receptacle to gather and encircle the grain and through it to deliver the band, the binding-head moving with its arm entirely upon the protected side of said receptacle, the rack which operates the mechanism in said binding-head, and the vibrating arm which operates the rack.

11. In combination with automatic binding mechanism, a one-way clutch, controlled by the attendant, in the train of gear which drives said mechanism, whereby the binder may be thrown into gear at will, but driven only during the forward movement of the harvester.

12. In combination with the band-carrying arm in an automatic binder, an adjusting device in the connection between said arm and its driving mechanism, to compensate for wear or springing of parts.

13. In combination with the band-carrying arm in an automatic binder, an adjusting device in the train by which it is driven, to adjust it relatively to said driving mechanism.

14. In combination with the arm upon which the binding-head is mounted, an adjusting device in the connection between said arm and the mechanism by which it is actuated, to secure proper relation of parts.

15. In combination with the band-carrying arm and the arm upon which the binding-head is mounted, means common to both for adjusting said arms relatively to the mechanism by which they are moved, that the wire may be accurately presented to the binding-head.

16. In combination with the arm by which the rack is actuated, an adjusting device between said arm and the mechanism by which it is moved, to determine the rotation of the twister.

17. In combination with the band-securing device, adjusting mechanism in its train, to enable it to be set to properly take the ends of the band as the latter is presented.

18. In combination with a rotary twister, mechanism for driving it, adjustable to govern its rotation.

19. The combination of the vibrating arm C, its pivot, the slotted crank, and the pitman adjustable in said crank to determine the limit of motion of said arm.

20. The combination of the vibrating arm which operates the rack, its pivot, the slotted crank upon its hub, and the pitman adjustable in said crank to determine the limit of motion.

21. The cam-slides K, constructed, substantially as described, with or without the anti-friction roll, and used to communicate motion to the working parts of a grain-binding machine, substantially as herein described.

22. The combination of a back-acting disengaging-coupling with a shaft, spring, and the disengaging-arm E, the combination operating so as to allow a backward motion to the harvester without affecting the process of binding or operating the parts of a binding-machine, substantially as set forth.

23. The combination of a back-acting disengaging-coupling with a disengaging cam-arm and a disengaging-lever, substantially as set forth.

24. The combination of a revolving cam-cylinder and its moving mechanism with the vibrating arm R, operating the rack by which the band-securing mechanism is actuated, the parts being constructed and operated substantially as set forth.

25. In combination with the band-carrying arm and the arm which carries the binding-head, the vibrating arm operating the rack, and mechanism actuating said arm immediately after the band-carrying arm meets the binding-head to move the rack.

26. The combination of a revolving cam-cylinder with vibrating arms carrying the band and binding-head, and a vibrating arm operating the rack which actuates the band-securing mechanism, the action of the latter arm immediately succeeding the meeting of the other two, substantially as set forth.

SYLVANUS D. LOCKE.

Witnesses:
CHAS. A. BROWN,
WM. ARCHIBALD.